United States Patent
Madnani et al.

(10) Patent No.: US 8,049,817 B2
(45) Date of Patent: Nov. 1, 2011

(54) METHOD AND SYSTEM FOR CALCULATING INTERLACE ARTIFACT IN MOTION PICTURES

(75) Inventors: Shekhar Madnani, Uttar Pradesh (IN); Shailesh Kumar, Uttar Pradesh (IN)

(73) Assignee: Interra Systems Inc., San Jose, CA (US)

( * ) Notice: Subject to any disclaimer, the term of this patent is extended or adjusted under 35 U.S.C. 154(b) by 584 days.

(21) Appl. No.: 12/286,798

(22) Filed: Oct. 2, 2008

(65) Prior Publication Data
US 2010/0085475 A1    Apr. 8, 2010

(51) Int. Cl.
*H04N 7/01*    (2006.01)

(52) U.S. Cl. ............................................. 348/451

(58) Field of Classification Search .................. 348/607, 348/611, 614, 625, 615, 618–621, 26; 382/266, 382/275
See application file for complete search history.

(56) References Cited

U.S. PATENT DOCUMENTS

| | | | |
|---|---|---|---|
| 5,625,421 A | 4/1997 | Faroudja et al. | |
| 5,638,139 A * | 6/1997 | Clatanoff et al. | 348/701 |
| 6,118,488 A * | 9/2000 | Huang | 348/452 |
| 6,262,773 B1 * | 7/2001 | Westerman | 348/448 |
| 6,295,091 B1 * | 9/2001 | Huang | 348/448 |
| 6,577,345 B1 * | 6/2003 | Lim et al. | 348/452 |
| 6,731,342 B2 * | 5/2004 | Shin et al. | 348/452 |
| 6,909,469 B2 | 6/2005 | Adams | |
| 7,142,247 B2 * | 11/2006 | Jung | 348/452 |
| 7,245,326 B2 * | 7/2007 | Orlick | 348/448 |
| 7,346,224 B2 * | 3/2008 | Kong et al. | 382/261 |
| 7,406,208 B2 * | 7/2008 | Chiang | 382/266 |
| 7,412,109 B2 * | 8/2008 | Kong et al. | 382/261 |
| 7,554,559 B2 * | 6/2009 | Lu et al. | 345/606 |
| 7,822,286 B2 * | 10/2010 | Yea et al. | 382/260 |

* cited by examiner

*Primary Examiner* — Paulos Natnael (57) ABSTRACT

A method and system for calculating an interlace artifact in image data are disclosed. A motion picture of the image data comprises a series of frames, captured at a predefined interval of time. During processing of the motion picture, the frames are divided into fields, each field comprising one or more pixels. A difference between the pixels of the fields is calculated. Thereafter, edges of the pixels are calculated in the fields. The method and system then identify the focused area in the fields. To calculate the interlace artifact in the motion picture, the displacement of the focused area is calculated by using motion vectors. The artifacts are calculated as a ratio of a number of pixels based on motion vector calculation.

20 Claims, 8 Drawing Sheets

METHOD AND SYSTEM FOR CALCULATING INTERLACE ARTIFACT IN MOTION PICTURES

FIELD OF THE INVENTION

The present invention generally relates to the field of quality checking of image data. More particularly, the invention relates to a method and a system for calculating an interlace artifact in the image data.

BACKGROUND OF THE INVENTION

Digital image processing is currently used in a variety of applications. Digital image processing includes image data acquisition, restoration, encoding, decoding processing, object recognition, and data filtering and enhancement. The image data that is processed during digital image processing includes, but is not limited to, motion pictures and images. During processing, the image data may become distorted due to introduction of artifacts in the image data. The artifacts are distortions in the image data that can be introduced inadvertently by hardware or software, or unintentionally by an operator. Artifacts introduced by hardware and software generally degrade the image data and distort interpretation. The artifacts may also be introduced in the image data due to faults that occur during acquisition of the image data, such as the improper handling of an image data acquisition device, or an induced noise. The artifacts introduced in the image data include, but are not limited to, an interlace artifact, a blur artifact, an aliasing artifact, and a noise artifact. The interlace artifact is introduced during interlacing of the motion picture. Interlacing involves creating frames of the motion picture using multiple fields. Interlaced motion picture is designed to be captured, transmitted or stored and displayed in the same interlaced format. The fields are captured at different instances; hence the interlaced motion picture exhibits motion artifacts if the recorded objects are moving fast enough to be in different positions when each individual field is captured. These artifacts may be visible when interlaced motion picture is displayed at a slower speed than it was captured or when still frames are presented. The presence of the artifacts results in an incorrect perception of the image data by the human eye. To overcome the artifacts, their calculation is necessary.

A traditional technique for calculating artifacts in the image data calculates the interlace artifact by using vertical frequency detection. Frequencies in the image data are detected by using the Discrete Fourier Transform that are then used to calculate the interlace artifact. However, the aforementioned technique fails to quantify and estimate the quality of the motion picture. Another traditional technique calculates the motion between frames of the motion picture. The motion between the frames is then used to calculate the interlace artifact. However, this technique suffers from the drawback of being incapable of quantifying the quality parameters of the motion picture.

Yet another traditional technique detects the motion of focused objects in an interlaced motion picture by using motion vectors. However, this technique does not quantify the artifacts.

Therefore, there exists a need for a method and a system for calculating the interlace artifact in the image data. The method and the system should preferably be capable of real-time quality checking of the image data. Further, the method and the system for calculating the interlace artifact in the image data should preferably be computationally faster than the traditional techniques for calculating the interlace artifact.

SUMMARY OF THE INVENTION

The present invention discloses a method for calculating an interlace artifact in a motion picture. The motion picture includes one or more frames defined at a predefined interval of time. Each of the one or more frames includes one or more fields and each of the one or more fields includes one or more pixels. The method involves division of the one or more fields into a first field and a second field. Further, one or more differences between the one or more pixels in the first field and the second field are determined. Thereafter, the maximum value of the one or more differences is compared with a first predefined threshold. Further, one or more edges of the one or more pixels are calculated in the first field based on a comparison of the maximum value with the first predefined threshold. The calculation of the one or more edges further includes calculating one or more edge gradients of the calculated one or more edges. Thereafter, the magnitude of each of the one or more edge gradients is compared with a second predefined threshold. The one or more edges in the first field, for which the one or more edge gradients is greater than or equal to the second predefined threshold are identified as one or more edge pixels of the one or more pixels. Thereafter, a set of edge pixels of the one or more edge pixels is calculated in the first field. The one or more edge pixels are present in an entire frame of the one or more frames whereas the set of edge pixels is a collection of the one or more edge pixels that are present only in a specific area of a frame of the one or more frames. This specific area is usually referred to as a focused area of the frame. Further, one or more sets of pixels of the one or more pixels are identified in the second field, based on a comparison of the one or more pixels in the second field with the set of edge pixels. Furthermore, displacement of the set of edge pixels is calculated in the first field with respect to each of the one or more sets of pixels in the second field. The displacement is calculated by calculating one or more motion vectors for the set of edge pixels. Finally, the interlace artifact is calculated by using the calculated displacement and a number of the one or more edge pixels in the set of edge pixels.

The present invention also discloses a system for calculating the interlace artifact in the motion picture. The system includes a processor for processing the motion picture. The processor comprises a comparator for comparing the one or more pixels. The comparator identifies a first field and a second field of the one or more fields. Thereafter, the comparator determines one or more differences between the one or more pixels in the first field and the second field. Further, the comparator compares the maximum value of the one or more differences with a first predefined threshold. The processor also comprises an edge calculator, which calculates one or more edges of the one or more pixels in the first field. The one or more edges are calculated based on a comparison of the maximum value with the first predefined threshold. Further, the comparison includes calculating an edge gradient of the calculated one or more edges. Thereafter, one or more edge pixels of the one or more pixels are identified in the first field based on a comparison of the edge gradients magnitude with a second predefined threshold. Thereafter, a set of edge pixels of the one or more edge pixels is calculated in the first field. Further, one or more sets of pixels of the one or more pixels in the second field are identified based on a comparison of the one or more pixels in the second field with the set of edge pixels. The processor also comprises a displacement calculator that calculates the displacement of the set of edge pixels in the first field with respect to each of the one or more sets of pixels in the second field. The displacement is calculated by calculating one or more motion vectors for the set of edge pixels. The processor also includes an artifacts calculator that calculates the interlace artifact. The interlace artifact is calculated based on the calculated displacement and a number of the one or more edge pixels in the set of edge pixels.

BRIEF DESCRIPTION OF THE FIGURES

The accompanying figures, wherein like reference numerals refer to identical or functionally similar elements throughout the separate views, and which, together with the detailed description below, are incorporated in and form part of the specification, serve to further illustrate various embodiments and explain various principles and advantages, all in accordance with the present invention.

The embodiments of the invention will hereinafter be described in conjunction with the appended drawings, provided to illustrate and not to limit the invention, wherein like designations denote like elements, and in which.

DETAILED DESCRIPTION OF THE INVENTION

Before describing in detail the particular method used for calculating an interlace artifact in a motion picture in accordance with various embodiments of the present invention, it should be observed that the present invention utilizes a combination of method steps and apparatus components related to the method for calculating the interlace artifact in the motion picture. Accordingly, the apparatus components and method steps have been represented in the drawings, where appropriate, with conventional symbols, showing only those specific details that are pertinent for an understanding of the present invention, so as not to obscure the disclosure with details that will be readily apparent to those with ordinary skill in the art having the benefit of the description herein.

In this document, the terms such as 'comprises', 'comprising', 'includes', 'including', or any other variation thereof, are intended to cover a non-exclusive inclusion, such that a process, article, system or apparatus that comprises a list of elements does not include only those elements, but may include other elements not explicitly listed or inherent to such a process, article or apparatus. The term 'another', as used in this document, is defined as at least a second or more. The terms 'includes' and/or 'having', as used herein, are defined as comprising.

Figure 1:
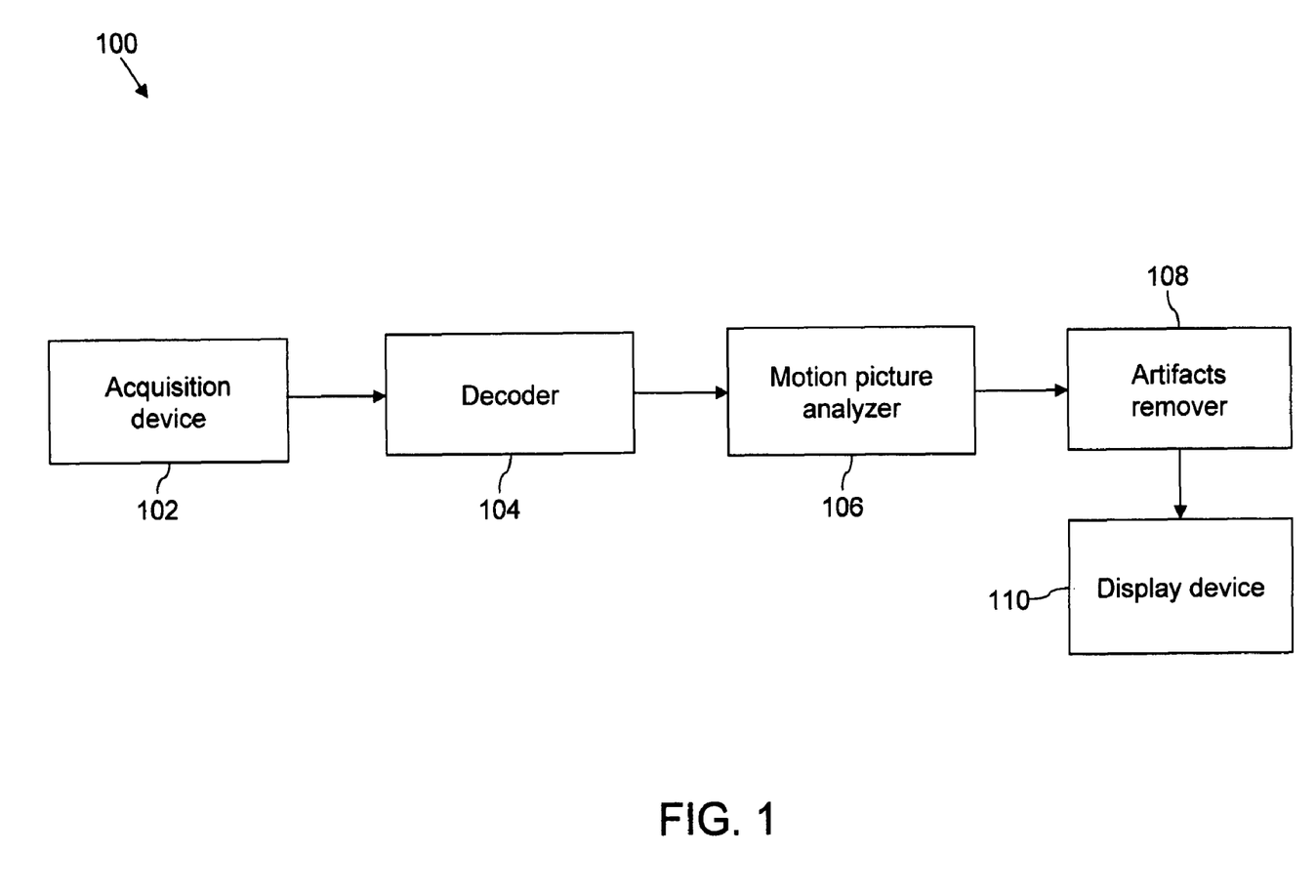
FIG. 1 illustrates a functional block diagram including an exemplary description of the methodology used in quality checking of a motion picture, in accordance with an embodiment of the present invention.

FIG. 1 illustrates a functional block diagram 100 including an exemplary description of the methodology used in quality checking of a motion picture in accordance with an embodiment of the present invention. The functional block diagram 100 comprises an acquisition device 102 that captures the motion picture. The motion picture is captured either as a series of one of more frames, or as a series of one or more fields. The one or more frames are captured after a predefined interval of time which is too short for perception by the human eye. Examples of the acquisition device 102 include an analog motion picture recorder such as a video cassette recording camera, or a digital motion picture recorder such as a digital camera. The captured motion picture is subsequently digitized in the analog motion picture recorder by a digitizer included in the acquisition device 102. The acquisition device 102 comprises sensors and charge coupled devices that capture the color signals of the motion picture. The color signals of the motion picture are then sampled as one or more pixels in the one or more fields and forwarded for encoding to an encoder.

The one or more fields are compressed by the encoder by using various compression techniques. According to an embodiment of the present invention, the acquisition device 102 includes the encoder for encoding the captured motion picture. The compression techniques used for encoding follow compression standards such as Moving Pictures Experts Group-1 (MPEG-1), Digital Video (DV), H.261, H.263, and Digital Video Express (DivX) to reduce file size of the motion picture. The compressed motion picture is then transmitted through a communication medium. The bandwidth required for the transmission is reduced by compression of the motion picture. The compressed motion picture is received by a decoder 104, which decodes the motion picture.

When the decoded motion picture is perceived, the presence of one or more artifacts in the motion picture is visualized. The one or more artifacts include, but are not limited to, an interlace artifact, a blur artifact, a noise artifact, and an aliasing artifact. The interlace artifact is clearly perceived by the human eye from among the one or more artifacts. The interlace artifact predominantly occurs due to a time difference between the one or more fields of moving objects in the motion picture and may also be perceived as stair-casing or a combing effect in the motion picture. There exist a number of ways by which the interlace artifact is introduced in the motion picture. The interlace artifact can be introduced in the motion picture during encoding or decoding of the motion picture. The interlace artifact can also be introduced due to faulty operation or incorrect handling of the acquisition device 102. Another way of introducing the interlace artifact is by capturing the one or more fields at different instances of time, resulting in the introduction of a time difference between the one or more fields. Yet another way that the interlace artifact can be introduced is by slow capturing of the motion picture which results in a low correlation between the one or more fields. The low correlation results in incorrect perception of the moving objects during display of the motion picture. For example, the interlace artifact is introduced in the motion picture when the one or more frames are captured at a frame rate of 25 frames per second. Hence, there is a time delay of 40 milliseconds between each of the one or more frames. The time delay results in the introduction of the interlace artifact in the motion picture. The interlace artifact causes distortion in the motion picture, which is perceived by the human eye. To remove the interlace artifact from the motion picture, accurate calculation of the interlace artifact is desired.

A motion picture analyzer 106 analyzes the motion picture received from the decoder 104 to calculate the interlace artifact. The motion picture analyzer 106 processes the motion picture and calculates a value of the interlace artifact in the motion picture. The calculated interlace artifact is transmitted to an artifacts remover 108, which uses artifacts removal techniques such as a frequency analysis method and motion vector analysis for removing the interlace artifact from the motion picture. After the removal of the interlace artifact, the motion picture is deinterlaced. Deinterlacing involves combining the one or more fields of the motion picture. Subsequently, the deinterlaced motion picture is displayed on a display device 110. Examples of the display device 110 include a thin film transistor screen, a cathode ray tube display and a plasma display screen. Further, if the Cathode Ray Tube (CRT) display is used as the display device 110, the motion picture can be displayed without being deinterlaced, since the CRT displays the motion picture in the form of the one or more fields. However, if the display device 110 includes the thin film transistor screen or the plasma display screen, the interlaced motion picture needs to be deinterlaced before being displayed.

Figure 2:
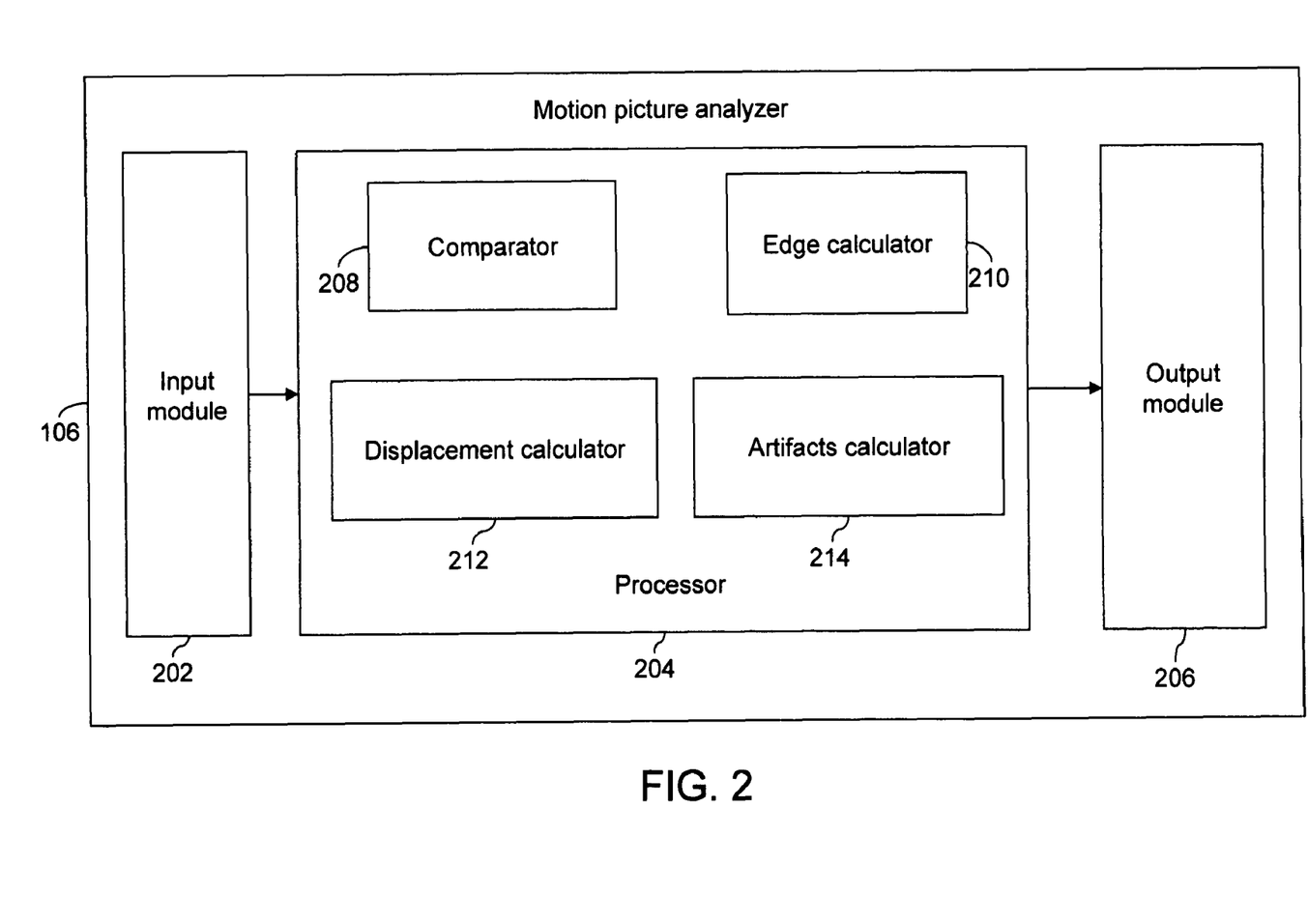
FIG. 2 illustrates a functional block diagram of a motion picture analyzer, in accordance with an embodiment of the present invention.

FIG. 2 illustrates a functional block diagram of the motion picture analyzer 106, in accordance with an embodiment of the present invention. The motion picture analyzer 106 comprises an input module 202, a processor 204, and an output module 206. The input module 202 receives the motion picture from the decoder 104 in the form of one or more fields and forwards the motion picture to the processor 204. The processor 204 includes a comparator 208, an edge calculator 210, a displacement calculator 212, and an artifacts calculator 214.

The comparator 208 determines one or more differences in luminance between the one or more corresponding pixels in the respective fields. The one or more corresponding pixels are present at equivalent locations in the respective fields. Each of the one or more pixels includes various attributes such as luminance and chrominance. In an embodiment of the present invention, the luminance of each of the one or more pixels is compared in the respective fields. Thereafter, the comparator 208 compares the maximum value of the determined one or more differences in the luminance of the one or more pixels with a first predefined threshold. If the maximum value of the determined one or more differences is greater than or equal to the first predefined threshold, a probability of the presence of an interlace artifact in the motion picture is indicated. The comparator 208 experimentally determines that the value of the first predefined threshold lies in the range of 25-70. Further, if the first predefined threshold is configured to have a low value that is closer to the minimum value of 25, then the probability of the interlace artifact is a low. Whereas, if the first predefined threshold is configured to have a high value that is closer to the maximum value of 70, then probability of the interlace artifact is high. Moreover, the comparator 208 usually configures the value of the first predefined threshold as 50 for an 8 bit depth of the motion picture. The bit depth of the motion picture quantifies colors in the digitized motion picture in terms of number of 0s and 1s, which are used to specify each color. For example, based on the binary representation, an 8 bit depth signifies 256 colors.

Subsequently, the edge calculator 210 performs edge calculation of the one or more pixels if the maximum value of the one or more differences is greater than or equal to the first predefined threshold. The edge calculator 210 calculates one or more edges of the one or more pixels in the motion picture by using an edge detection method such as a Sobel operator, a Canny edge detector, and a Laplacian edge detector. The one or more edges are calculated for accurate calculation of the interlace artifact, since the one or more edges comprise high frequency components of the one or more pixels in the motion picture which are prone to introduction of the interlace artifact. Further, the edge calculator 210 identifies a focused area in the calculated one or more edges to calculate the interlace artifact. In an embodiment of the present invention, the focused area includes an object in motion in the one or more frames of the motion picture such as a ball in motion, a running athlete, or a vehicle in motion on a road. In another embodiment of the present invention, the focused area includes stationary objects. The one or more pixels in the focused area are prone to get displaced during motion picture processing, and hence get affected by the interlace artifact. The displacement calculator 212 calculates the displacement of the focused area in the one or more fields by using one or more motion vectors. Hereinafter, the one or more motion vectors are denoted by $MV_E$. The magnitude of the $MV_E$ is denoted by $|MV_E|$ and is defined as:

$$|MV_E| = \sqrt{MV_{EX}^2 + MV_{EY}^2} \tag{1}$$

Where, $MV_{EX}$ is a component of $MV_E$ in the x-direction and $MV_{EY}$ is the component of $MV_E$ in the y-direction. Further, the $|MV_E|$ can be approximated as:

$$|MV_E| \approx |MV_{EX}| + |MV_{EY}| \tag{2}$$

Thereafter, the artifacts calculator 214 calculates the interlace artifact in the motion picture based on the calculated $|MV_E|$. More details regarding the functioning of the processor 204 are provided in FIG. 3 and FIG. 4. The calculated interlace artifact is then reported to the user by the output module 206 in the form of a scalar or a vector. An output from the motion picture analyzer 106 is received by the artifacts remover 108.

Figure 3:
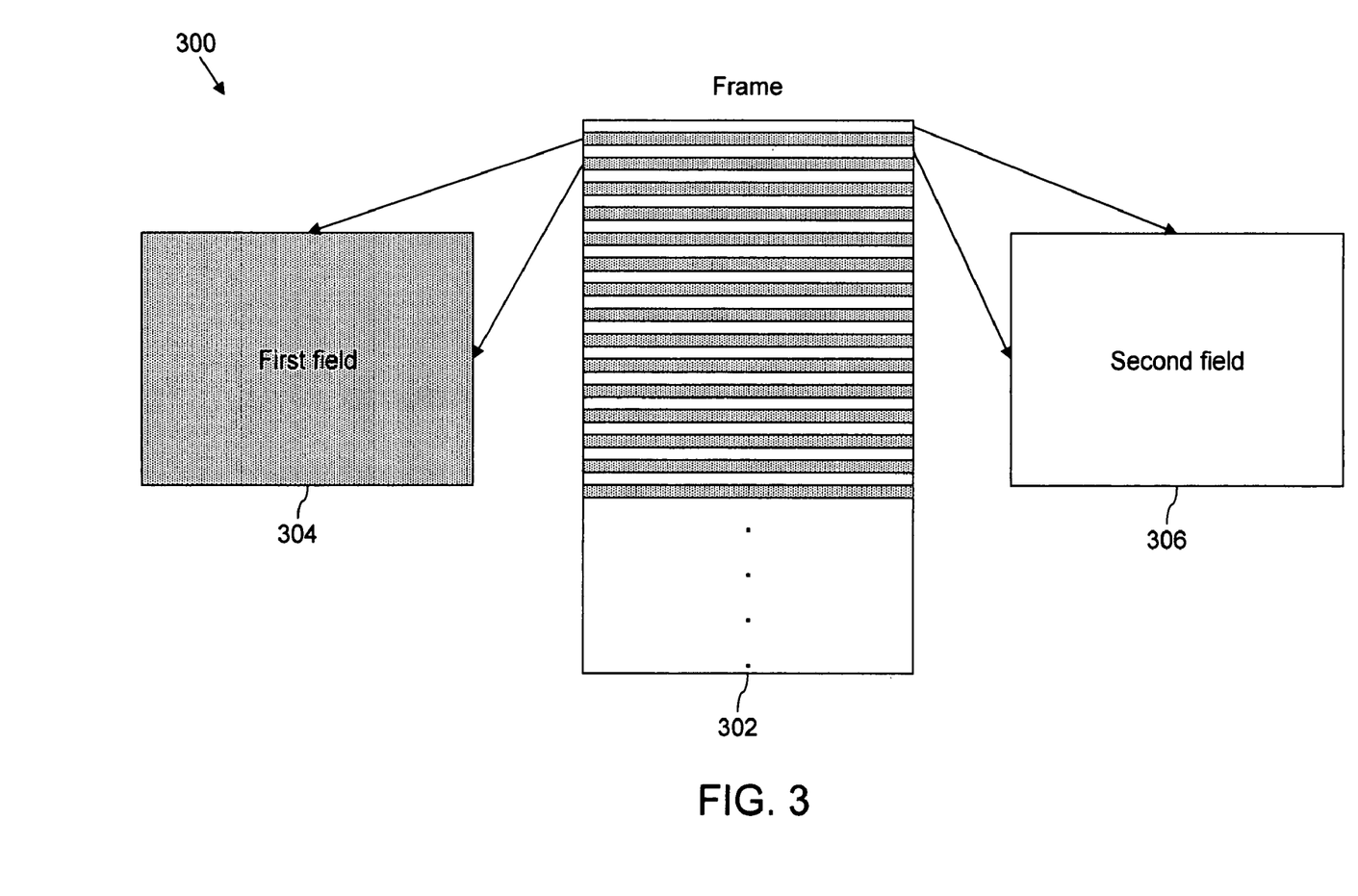
FIG. 3 illustrates a functional block diagram for one or more fields, in accordance with an embodiment of the present invention.

FIG. 3 illustrates a functional block diagram 300 for one or more fields in accordance with an embodiment of the present invention. The functional block diagram 300 involves division of a frame 302 of the one or more frames into even and odd fields. The even fields of the one or more frames are linearly interpolated to form a first field 304. Similarly, the odd fields of the one or more fields are linearly interpolated to form a second field 306. Division of the frame 302 into even fields and odd fields reduces the transmission bandwidth required by the communication medium for transmitting the frame 302. The comparator 208 determines one or more differences between the one or more pixels in the first field 304 and the one or more corresponding pixels in the second field 306. The one or more corresponding pixels in the second field 306 have equivalent location as the one or more pixels in the first field 304. Furthermore, the comparator 208 compares the maximum value of the determined one or more differences with the first predefined threshold. If the maximum value of the one or more differences is greater than or equal to the first predefined threshold, a probability of the presence of the interlace artifact in the motion picture is indicated.

If the probability of the presence of the interlace artifact is indicated, then the one or more edges are calculated in the first field 304 by the edge calculator 210. The edge calculator 210 uses edge detection methods such as a Sobel operator method, a Canny edge detector method, and a Laplacian edge detector method. In an embodiment of the present invention, the first field 304 is operated with a 3×3 vertical Sobel operator to calculate one or more edges. The 3×3 vertical Sobel operator is defined as follows:

$$S_x = \begin{pmatrix} -1 & 0 & 1 \\ -2 & 0 & 2 \\ -1 & 0 & 1 \end{pmatrix} \quad (3)$$

Where, $S_x$ denotes the 3×3 vertical Sobel operator.

On applying $S_x$ on the first field 304, the magnitude of one or more edge gradients of the one or more edges in the first field 304 is obtained. If the first field 304 is denoted by I and the magnitude of the one or more edge gradients by $I_{DX}$, the magnitude of the one or more edge gradients can be calculated as:

$$I_{DX} = I * S_X \quad (4)$$

Where, * denotes the convolution operation.

The one or more edge gradients are calculated in the first field 304 to identify high frequency components of the one or more pixels. The magnitude of the one or more edge gradients is then compared with a second predefined threshold to identify one or more edge pixels of the one or more pixels in the first field 304. If the magnitude of an edge gradient of the one or more edge gradients is greater than or equal to the second predefined threshold, then the corresponding one or more pixels are one or more edge pixels. The one or more edge pixels are the one or more valid edge pixels that are perceived by the human eye. Hereinafter, the one or more edge pixels will be referred as one or more valid edge pixels. The comparator 208 experimentally determines that the value of the second predefined threshold lies in the range of 15-35. For example, the second predefined threshold has a value of 15 for the one or more frames having low value of contrast. The edge calculator 210 is not able to distinctly recognize the one or more edges in the one or more frames due to low contrast value. However, if the value of the second predefined threshold is 35, then the one or more frames have high value of contrast which enables the edge calculator 210 to distinctly recognize the one or more edges. As determined experimentally, 80 percent of the one or more pixels included in the frame 302 are the one or more valid edge pixels. Further, the second predefined threshold is determined such that 80 percent of the one or more pixels in the frame 302 have edge gradient magnitude greater than the second predefined threshold.

Thereafter, the displacement of the focused area is calculated by the displacement calculator 212, and subsequently the interlace artifact is calculated based on the calculated displacement. More details regarding the calculation of the interlace artifact are provided in FIG. 4.

The calculated interlace artifact is transmitted to the artifacts remover 108 which uses artifacts removal techniques such as a frequency analysis method and motion vector analysis to remove the interlace artifact from the motion picture. After the removal of the interlace artifact, the motion picture is deinterlaced before being displayed. Deinterlacing involves combining the even and the odd fields included in the first field 304 and the second field 306 respectively to form the frame 302. However, while displaying the motion picture, if a CRT is used as the display device 110, the interlaced motion picture can be displayed without being deinterlaced. Whereas, if the display device 110 includes a thin film transistor screen or a plasma display screen, the interlaced motion picture needs to be deinterlaced before being displayed.

Figure 4:
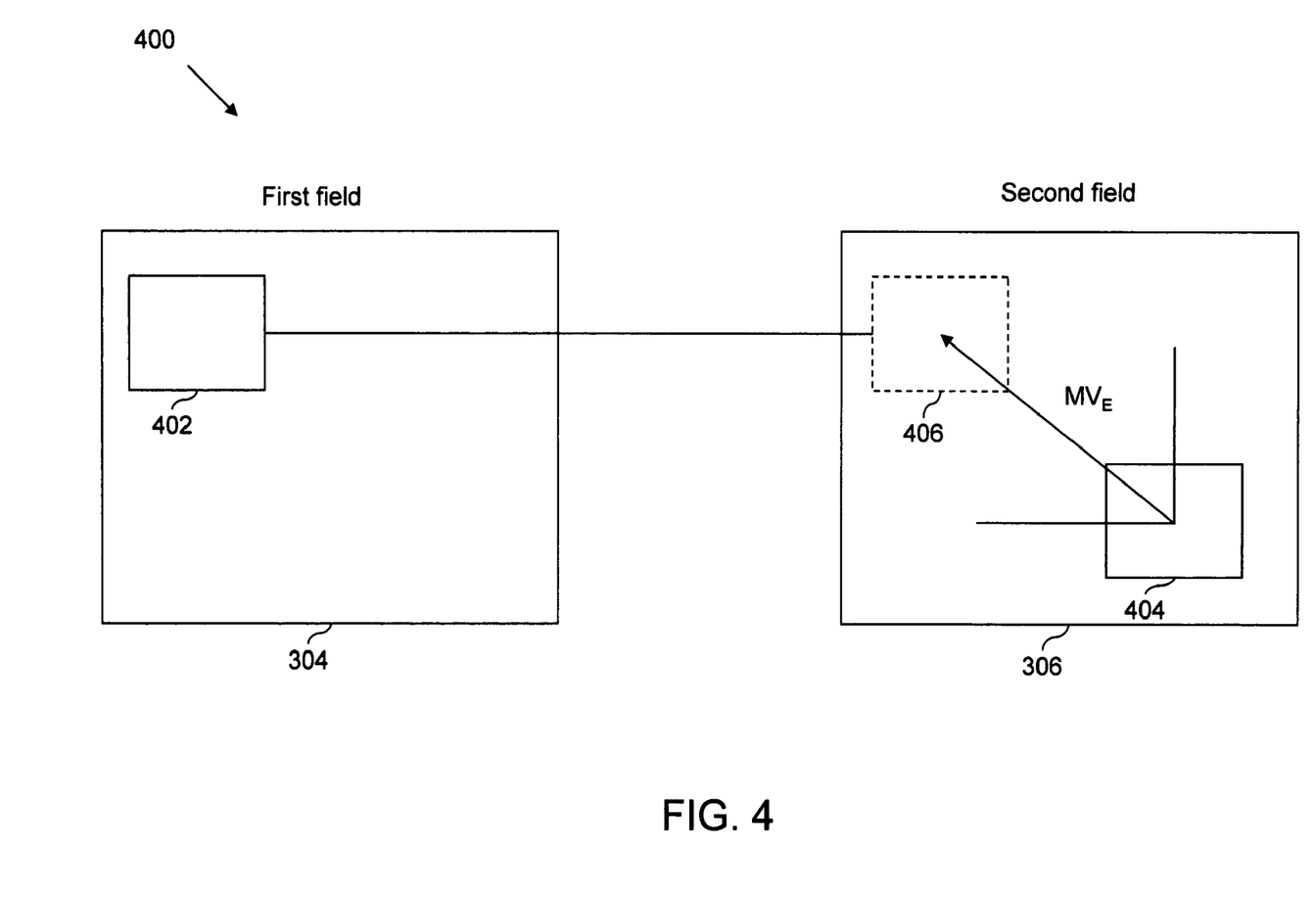
FIG. 4 illustrates a functional block diagram for motion vector analysis to calculate the interlace artifact, in accordance with an embodiment of the present invention.

FIG. 4 illustrates a functional block diagram 400 for motion vector analysis to calculate the interlace artifact in accordance with an embodiment of the present invention. To describe the functional block diagram 400, reference will be made to FIG. 1, FIG. 2 and FIG. 3, although it should be understood by a person ordinarily skilled in the art that the functional block diagram 400 can also be implemented with reference to any other embodiment of the present invention. A focused area is identified in the first field 304 by calculating a square of side N surrounding the one or more valid edge pixels and is represented by a set of valid edge pixels 402. Thereafter, the comparator 208 compares the set of valid edge pixels 402 with the one or more pixels in the second field 306 to identify one or more sets of pixels 404 in the second field 306. The one or more sets of pixels 404 correspond to the focused area in the first field 304.

The focused area in the motion picture may include objects that are in motion. For the objects in motion, the set of valid edge pixels 402 tend to shift from the desired location in the one or more frames. The displacement is reflected in the one or more fields. The shift of the set of valid edge pixels 402 from the desired location is calculated as displacement of the set of valid edge pixels 402 with respect to the one or more sets of pixels 404. The displacement calculator 212 calculates the displacement by using the $MV_E$. The displacement calculator 212 calculates the $MV_E$ between a projection 406 of the set of valid edge pixels 402 and the one or more sets of pixels 404. The coordinates of the projection 406 in the second field 306 are equal to the coordinates of the set of valid edge pixels 402 in the first field 304.

Thereafter, the comparator 208 compares the $|MV_E|$ of each of the valid edge pixels in the set of valid edge pixels 402 with a third predefined threshold. If the $|MV_E|$ of a valid edge pixel exceeds the third predefined threshold, then the objects in the motion picture are in motion. Hence, the interlace artifact is present in the corresponding valid edge pixel. Thereafter, the artifacts calculator 214 calculates a number of the valid edge pixels and a number of the valid edge pixels in the set of valid edge pixels 402 with $|MV_E|$ exceeding a third predefined threshold. The comparator 208 experimentally determines that the value of the third predefined threshold lies in the range of 8-24. The value of the third predefined threshold defines the sensitivity of the artifacts calculator 214. If the third predefined threshold is configured to have a low value, which is close to 8, the artifacts calculator 214 can calculate even a small amount of interlace artifact in the motion picture.

The interlace artifact calculated by the artifacts calculator 214 is displayed on the output module 206 as a scalar or a vector. The calculation of the interlace artifact is denoted by the following mathematical equation:

$$\text{Interlace Artifact} = \frac{N_{MVE}}{N_E} \quad (5)$$

Where, $N_{MVE}$ is a number of the one or more valid edge pixels in the set of valid edge pixels 402 for which $|MV_E|$ exceeds the third predefined threshold: and $N_E$ is the total number of the one or more valid edge pixels in the set of valid edge pixels 402.

Figure 5:
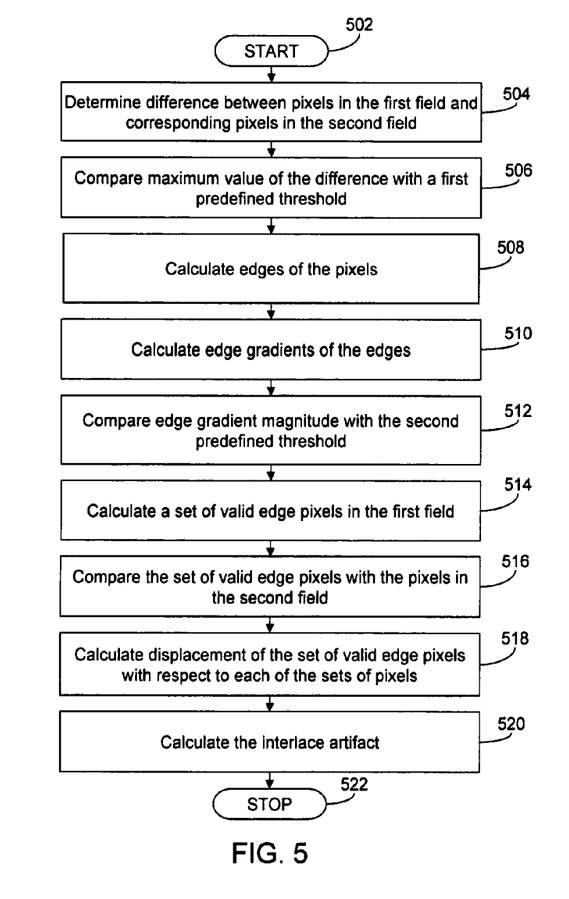
FIG. 5 is a flow diagram illustrating a method for calculating the interlace artifact in the motion picture, in accordance with an embodiment of the present invention.

FIG. 5 is a flow diagram illustrating a method for calculating an interlace artifact in the motion picture in accordance with an embodiment of the present invention. To describe the flow diagram, reference will be made to FIGS. 2, 3 and 4, although it should be understood by a person ordinarily skilled in the art that the flow diagram can also be implemented with reference to any other suitable embodiment of the present invention. The method is initiated at step 502. At step 504, the comparator 208 determines one or more differences in luminance between one or more pixels in the first field 304 and the corresponding one or more pixels in the second field 306. The corresponding one or more pixels in the second field 306 have equivalent location as the one or more pixels in the first field 304. Each of the one or more pixels includes various attributes such as luminance, and chrominance. In an embodiment, the comparator 208 compares the luminance of each of the one or more pixels in the first field 304 and the luminance of each of the one or more pixels in the second field 306. At step 506, the maximum value of the one or more differences is compared with a first predefined threshold by the comparator 208. The comparison determines a probability of the presence of the interlace artifact in the motion picture. Subsequently, at step 508, the edge calculator 210 calculates one or more edges of the one or more pixels in the first field 304 by using an edge detection method such as a Sobel Operator, a Canny edge detector, and a Laplacian edge detector. Thereafter, at step 510, one or more edge gradients of the calculated one or more edges is calculated by the edge calculator 210. Further, the magnitude of the one or more edge gradients is calculated. The one or more edges are calculated for the accurate calculation of the interlace artifact, since the one or more edges comprise high frequency components of the one or more pixels in the motion picture and are prone to introduction of the interlace artifact.

At step 512, the comparator 208 compares the magnitudes of the one or more edge gradients with a second predefined threshold. If the magnitude of an edge gradient of the one or more edge gradients is greater than or equal to the second predefined threshold, then the corresponding one or more pixels are one or more edge pixels. The one or more edge pixels are the one or more valid edge pixels that are perceived by the human eye. Based on the comparison, at step 514, the edge calculator 210 calculates a set of valid edge pixels 402 surrounding each of the one or more valid edge pixels representing a focused area in the first field 304. Thereafter, at step 516, the comparator 208 compares the set of valid edge pixels 402 with the one or more pixels in the second field 306 to identify one or more sets of pixels 404 in the second field 306. The one or more sets of pixels 404 correspond to the focused area of the first field 304.

At step 518, the displacement calculator 212 calculates the displacement between the set of valid edge pixels 402 in the first field 304 and the one or more sets of pixels 404 in the second field 306. The displacement is calculated using $MV_E$. Finally, at step 520, the interlace artifact is calculated as a ratio of a number of the one or more valid edge pixels in the set of valid edge pixels 402 with the $|MV_E|$ exceeding the third predefined threshold, and the total number of the one or more valid edge pixels in the set of valid edge pixels 402. Thereafter, the method terminates at step 522.

Figure 6:
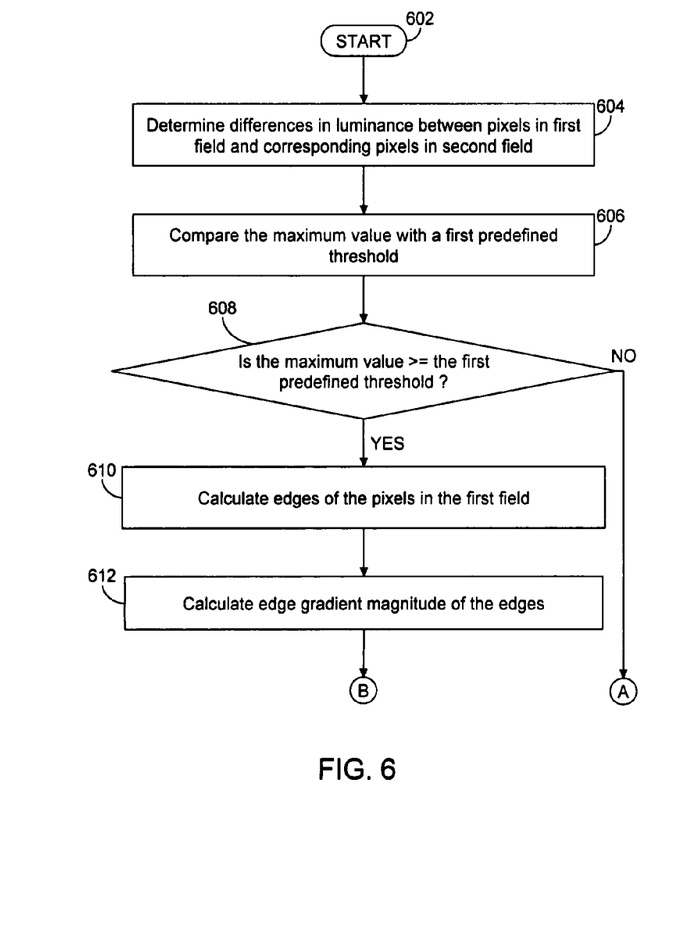
FIGS. 6, 7, and 8 are flow diagrams illustrating a method for calculating the interlace artifact in the motion picture, in accordance with another embodiment of the present invention.
Figure 7:
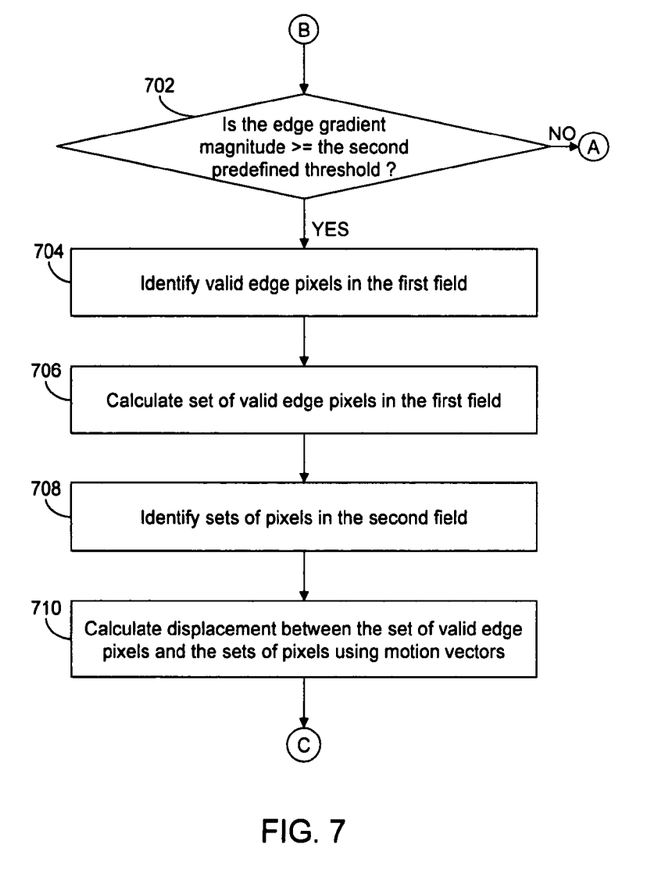
Figure 8:
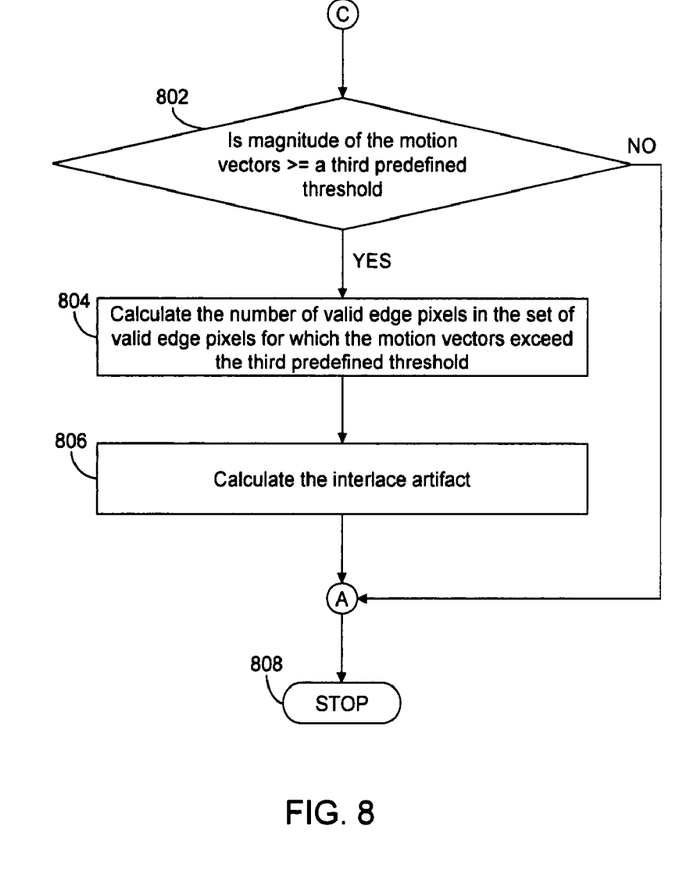

FIGS. 6, 7, and 8 are flow diagrams illustrating a method for calculating the interlace artifact in the motion picture in accordance with another embodiment of the present invention. To describe the flow diagrams, reference will be made to FIGS. 2, 3, and 4, although it should be understood by a person ordinarily skilled in the art that the flow diagram can also be implemented with reference to any other suitable embodiment of the present invention.

The method is initiated at step 602. At step 604, the comparator 208 determines one or more differences between luminance of one or more pixels in the first field 304 and luminance of the one or more corresponding pixels in the second field 306. The corresponding one or more pixels in the second field 306 have equivalent location as the one or more pixels in the first field 304. Each of the one or more pixels includes various attributes such as luminance, and chrominance. In an embodiment, the luminance of each of the one or more pixels in the first field 304 is compared with the luminance of corresponding one or more pixels in the second field 306. Thereafter, at step 606, the comparator 208 compares the maximum value of the one or more differences with the first predefined threshold to determine a probability of occurrence of the interlace artifact. At step 608, the comparator 208 checks whether the maximum value of the difference is greater than or equal to the first predefined threshold. The comparator 208 experimentally determines the first predefined threshold that is configured, in this example, to have a value of 50 for an 8 bit depth of the motion picture. The bit depth of the motion picture quantifies colors in the digitized motion picture in terms of number of 0s and 1s, which are used to specify each color. For example, based on the binary representation, an 8 bit depth signifies 256 colors. If the maximum value of the difference is greater than or equal to the first predefined threshold, the probability of the presence of the interlace artifact in the motion picture is indicated and step 610 is executed. If the maximum value of the difference is less than the first predefined threshold, the interlace artifact is absent in the motion picture and the method terminates.

At step 610, the edge calculator 210 calculates one or more edges for the one or more pixels in the first field 304 by using one of a Sobel operator, a Canny edge detector, and a Laplacian edge detector. The one or more edges are calculated as they constitute high frequency components in the motion picture and are prone to the interlace artifact. In an embodiment of the present invention, the first field 304 is operated with the 3×3 vertical Sobel operator, as defined in the equation (3), to calculate the one or more edges. At step 612, the edge calculator 210 calculates the magnitude of the one or more edge gradients of the calculated one or more edges, as defined in the equation (4).

At step 702, the comparator 208 compares the magnitude of the one or more edge gradients, hereinafter denoted by $I_{DX}(x, y)$, with the second predefined threshold to calculate one or more valid edge pixels in the first field 304. If one or more $I_{DX}(x, y)$ is greater than or equal to the second predefined threshold, hereinafter denoted by $Th_E$, step 704 is executed. If all $I_{DX}(x, y)$ are less than $Th_E$, the interlace artifact is not present in the motion picture and thus the method terminates. The second predefined threshold is determined experimentally by the comparator 208 and varies between a range of 15 to 35. As determined experimentally, 80 percent of the one or more pixels included in the frame 302 are the one or more valid edge pixels. Further, the second predefined threshold is determined such that 80 percent of the one or more pixels in the frame 302 have edge gradient magnitude greater than the second predefined threshold.

At step 704, one or more valid edge pixels in the first field 304 are calculated based on comparison with the second predefined threshold. Thereafter, at step 706, a focused area is identified in the first field 304 by calculating a square of side N surrounding the one or more valid edge pixels and is represented by a set of valid edge pixels 402. At step 708, the comparator 208 compares the set of valid edge pixels 402 in the first field 304 with the one or more pixels in the second field 306 to calculate one or more sets of pixels 404 in the second field 306. The one or more sets of pixels 404 correspond to the focused area in the first field 304. Each of the one or more sets of pixels 404 in the second field 306 is a square of side N.

Thereafter, at step 710, the displacement calculator 212 calculates the displacement between the set of valid edge pixels 402 in the first field 304, and the one or more sets of pixels 404, in the second field 306, by using the $MV_E$. The displacement calculator 212 calculates the $MV_E$ between a projection 406 of the set of valid edge pixels 402 and the one or more sets of pixels 404. The projection 406 is a replica of the area of the set of valid edge pixels 402 in the second field 306. Thereafter, the displacement calculator 212 calculates the $|MV_E|$ for the calculated $MV_E$.

At step 802, the comparator 208 compares the $|MV_E|$ of each of the valid edge pixels in the set of valid edge pixels 402 with a third predefined threshold. If the $|MV_E|$ Of a valid edge pixel exceeds the third predefined threshold, then the interlace artifact is present in the corresponding valid edge pixel and step 804 is executed. If the $|MV_E|$ of a valid edge pixel is less than the third predefined threshold, then the method terminates. In an embodiment of the present invention, the third predefined threshold can be assigned a fixed value W or configured based on user input. The value of W usually varies from 8 to 24.

At the step 804, the artifacts calculator 214 calculates a number of the valid edge pixels in the set of valid edge pixels 402 with $|MV_E|$ exceeding the third predefined threshold. At step 806, the artifacts calculator 214 calculates the interlace artifact according to the equation (5). The interlace artifact calculated by the artifacts calculator 214 is displayed on the output module 206 as a scalar or a vector. Thereafter, the method terminates at step 808.

Various embodiments, as discussed above, provide a method and a system for calculating interlace artifact in motion pictures. The method and the system are used for real-time quality checking of the motion pictures. The process of interlacing (division of a frame into even and odd fields) of the motion pictures is auto-controlled. The value of the interlace artifact that is calculated in the motion picture analyzer can be provided as a feedback to the acquisition device. The feedback will help in automatically controlling interlacing, and thus minimizing the introduction of the interlace artifact in subsequent frames of the motion picture. This helps in avoiding the introduction of the interlace artifact. Further, the interlace artifact in the motion picture is calculated automatically and accurately during analysis of the motion picture. The method is also helpful when the motion picture is being deinterlaced, since only the one or more frames that have the interlace artifact need to be deinterlaced. Further, the method and the system identify the one or more edge pixels with a high value of the $MV_E$ which are more sensitive to the interlace artifact.

The method and the system calculate the interlace artifact using simple mathematical computations. This is contrary to the complex computations used by the traditional methods for calculating the interlace artifact. Therefore, the method and the system in the present invention are computationally faster than traditional methods for calculating the interlace artifact.

The method and system for calculating the interlace artifact in a motion picture, as described in the present invention, may be embodied in the form of a computer system. Typical examples of a computer system include a general-purpose computer, a programmed microprocessor, a micro-controller, a peripheral IC element, and other devices or arrangements of devices that are capable of implementing the steps that constitute the method of the present invention.

The computer system may comprise a computer, an input device, and a display unit. The computer may comprise a microprocessor, which is connected to a communication bus. The computer also includes a memory, which may include Random Access Memory (RAM) and Read Only Memory (ROM). Further, the computer system comprises a storage device, which can be a hard disk drive or a removable storage drive such as a floppy disk drive, an optical disk drive, and the like. The storage device can also be other similar means for loading computer programs or other instructions into the computer system.

The computer system executes a set of instructions that are stored in one or more storage elements to process input data. The storage elements may also store data or other information, as desired, and may be in the form of an information source or a physical memory element present in the processing machine. Exemplary storage elements include a hard disk, a DRAM, an SRAM and an EPROM. Storage elements may also be external to the computer system, and be connected to or inserted into the computer, to be downloaded at or prior to the time of use. Examples of such external computer program products include computer-readable storage mediums such as CD-ROMS, flash chips, floppy disks, and the like.

The set of instructions may include various commands that instruct a processing machine to perform specific tasks, such as the steps that constitute the method of the present invention. The set of instructions may be in the form of a software program. The software may be in various forms, such as system or application software. Further, the software may be in the form of a collection of separate programs, a program module with a larger program, or a portion of a program module. The software may also include modular programming in the form of object-oriented programming. The software program containing the set of instructions can be embedded in a computer program product for use with a computer, with the computer program product comprising a computer-usable medium that has a computer-readable program code embodied therein. Processing of input data by the processing machine may be in response to users' commands, to the result of previous processing, or in response to a request made by another processing machine.

The modules described herein may include processors and program instructions that implement the functions of the modules described herein. Some or all the functions can be implemented by a state machine that has no stored program instructions, or in one or more application-specific integrated circuits (ASICs), in which each function or some combinations of certain of the functions are implemented as custom logic.

In the foregoing specification, the invention and its benefits and advantages have been described with reference to specific embodiments. However, persons with ordinary skill in the art would appreciate that various modifications and changes can be made, without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A method for calculating an interlace artifact in a motion picture, the motion picture comprising one or more frames defined at a predefined interval of time, each of the one or more frames comprising one or more fields, each of the one or more fields comprising one or more pixels, the method comprising:

determining one or more differences between the one or more pixels in a first field of the one or more fields and the one or more pixels in a second field of the one or more fields;

comparing a maximum value of the one or more differences with a first predefined threshold;

calculating one or more edges for the one or more pixels in the first field based on the comparison of the maximum value with the first predefined threshold, wherein calculating the one or more edges comprises calculating one or more edge gradients of the calculated one or more edges;

comparing a magnitude of each of the one or more edge gradients with a second predefined threshold;

identifying one or more edge pixels of the one or more pixels in the first field where an edge gradient magnitude of the one or more edge pixels exceeds the second predefined threshold;

calculating a set of edge pixels of the one or more edge pixels in the first field, wherein one or more sets of pixels of the one or more pixels in the second field are identified based on a comparison of the one or more pixels in the second field with the set of edge pixels in the first field;

calculating displacement of the set of edge pixels in the first field with respect to each of the one or more sets of pixels in the second field, wherein the displacement is calculated by calculating one or more motion vectors for the set of edge pixels; and calculating the interlace artifact, wherein the interlace artifact is calculated using the calculated displacement, and wherein the interlace artifact being calculated is based on a number of the one or more edge pixels in the set of edge pixels.

2. The method according to claim 1, wherein determining the one or more differences comprises determining the one or more differences in luminance of the one or more pixels in the first field with the luminance of the one or more pixels in the second field.

3. The method according to claim 1, wherein the one or more edges in the first field is calculated using an edge detection method selected from the group consisting of a Sobel operator method, a Canny edge detector method, and a Laplacian edge detector method.

4. The method according to claim 1, wherein the one or more edges in the first field are calculated when the maximum value exceeds the first predefined threshold.

5. The method according to claim 1, wherein calculating the displacement further comprises calculating a magnitude of the one or more motion vectors between each of the one or more sets of pixels in the second field and the set of edge pixels in the first field.

6. The method according to claim 1, wherein calculating the interlace artifact comprises:

calculating a number of the one or more edge pixels in the set of edge pixels;

calculating a number of the one or more edge pixels in the set of edge pixels for which magnitude of the one or more motion vectors exceeds a third predefined threshold; and computing a ratio of the number of the one or more edge pixels for which the magnitude of the one or more motion vectors exceeds the third predefined threshold and the number of the one or more edge pixels in the set of edge pixels.

7. A system for calculating an interlace artifact in a motion picture, the motion picture comprising one or more frames defined at a predefined interval of time, each of the one or more frames comprising one or more fields, each of the one or more fields comprising one or more pixels, the system comprising:

a processor, the processor comprising:

a comparator, the comparator being capable of:

determining one or more differences between the one or more pixels in a first field of the one or more fields and the one or more pixels in a second field of the one or more fields; and comparing a maximum value of the one or more differences with a first predefined threshold;

an edge calculator, the edge calculator being capable of:

calculating one or more edges for the one or more pixels in the first field based on the comparison of the maximum value with the first predefined threshold, wherein calculating the one or more edges comprises calculating one or more edge gradients of the calculated one or more edges;

identifying one or more edge pixels of the one or more pixels in the first field, wherein an edge gradient magnitude of the calculated one or more edge gradients of the one or more edge pixels exceed a second predefined threshold;

calculating a set of edge pixels of the one or more edge pixels in the first field, wherein one or more sets of pixels of the one or more pixels in the second field are identified based on a comparison of the one or more pixels in the second field with the set of edge pixels;

a displacement calculator, the displacement calculator being capable of calculating displacement of the set of edge pixels in the first field with respect to each of the one or more sets of pixels in the second field, wherein the displacement is calculated by calculating one or more motion vectors for the set of edge pixels; and an artifacts calculator, the artifacts calculator being capable of calculating the interlace artifact, wherein the interlace artifact is calculated using the calculated displacement, and wherein the interlace artifact is calculated based on a number of the one or more edge pixels in the set of edge pixels.

8. The system according to claim 7, wherein the system further comprises an input module, the input module being capable of receiving the motion picture.

9. The system according to claim 7, wherein the system further comprises an output module, the output module being capable of displaying the calculated interlace artifact.

10. The system according to claim 7, wherein the comparator is further capable of comparing a magnitude of each of the one or more edge gradients with the second predefined threshold.

11. The system according to claim 7, wherein the comparator is capable of determining one or more differences in luminance of the one or more pixels in the first field with luminance of the one or more pixels in the second field.

12. The system according to claim 7, wherein the edge calculator is further capable of calculating the one or more edges in the first field when the maximum value exceeds the first predefined threshold.

13. The system according to claim 7, wherein the edge calculator is capable of calculating the one or more edges in the first field using an edge detection method selected from the group consisting of a Sobel operator method, a Canny edge detector method, and a Laplacian edge detector method.

14. The system according to claim 7, wherein the displacement calculator is capable of calculating magnitude of the one or more motion vectors between each of the one or more sets of pixels in the second field and the set of edge pixels in the first field.

15. The system according to claim 7, wherein the artifacts calculator is further capable of:
- calculating a number of the one or more edge pixels in the set of edge pixels;
- calculating a number of the one or more edge pixels in the set of edge pixels for which a magnitude of the one or more motion vectors exceed a third predefined threshold; and
- computing a ratio of the number of the one or more edge pixels for which the magnitude of the one or more motion vectors exceed the third predefined threshold and the number of the one or more edge pixels in the set of edge pixels.

16. A computer program product for calculating an interlace artifact in a motion picture, the motion picture comprising one or more frames defined at a predefined interval of time, each of the one or more frames comprising one or more fields, each of the one or more fields comprising one or more pixels, the computer program product comprising instructions stored in a computer readable medium comprising:
- program instructions for determining one or more differences between the one or more pixels in a first field of the one or more fields and the one or more pixels in a second field of the one or more fields;
- program instructions for comparing a maximum value of the one or more differences with a first predefined threshold;
- program instructions for calculating one or more edges for the one or more pixels in the first field based on the comparison of the maximum value with the first predefined threshold, wherein calculating the one or more edges comprises calculating one or more edge gradients of the calculated one or more edges;
- program instructions for comparing a magnitude of each of the one or more edge gradients with a second predefined threshold;
- program instructions for identifying one or more edge pixels of the one or more pixels in the first field where an edge gradient magnitude of the one or more edge pixels exceed the second predefined threshold;
- program instructions for calculating a set of edge pixels of the one or more edge pixels in the first field, wherein one or more sets of pixels of the one or more pixels in the second field are identified based on a comparison of the one or more pixels in the second field with the set of edge pixels;
- program instructions for calculating displacement of the set of edge pixels in the first field with respect to each of the one or more sets of pixels in the second field, wherein the displacement is calculated by calculating one or more motion vectors for the set of edge pixels; and
- program instructions for calculating the interlace artifact, wherein the interlace artifact is calculated using the calculated displacement, and wherein the interlace artifact is calculated based on a number of the one or more edge pixels in the set of edge pixels.

17. The computer program product according to claim 16, wherein program instructions for determining the one or more differences comprise program instructions for determining the one or more differences in luminance of the one or more pixels in the first field with the luminance of the one or more pixels in the second field.

18. The computer program product according to claim 16, wherein the one or more edges in the first field are calculated when the maximum value exceeds the first predefined threshold.

19. The computer program product according to claim 16, wherein program instructions for calculating the displacement further comprise program instructions for calculating magnitude of the one or more motion vectors between each of the one or more sets of pixels in the second field and the set of edge pixels in the first field.

20. The computer program product according to claim 16, wherein program instructions for calculating the interlace artifact comprise:
- program instructions for calculating a number of the one or more edge pixels in the set of edge pixels;
- program instructions for calculating a number of the one or more edge pixels in the set of edge pixels for which magnitude of the one or more motion vectors exceed a third predefined threshold; and
- program instructions for computing a ratio of the number of the one or more edge pixels for which the magnitude of the one or more motion vectors exceed the third predefined threshold and the number of the one or more edge pixels in the set of edge pixels.

* * * * *